Oct. 26, 1926.
C. M. WOLFE
1,604,331
TOWEL OR UTENSIL RACK
Filed June 11, 1925
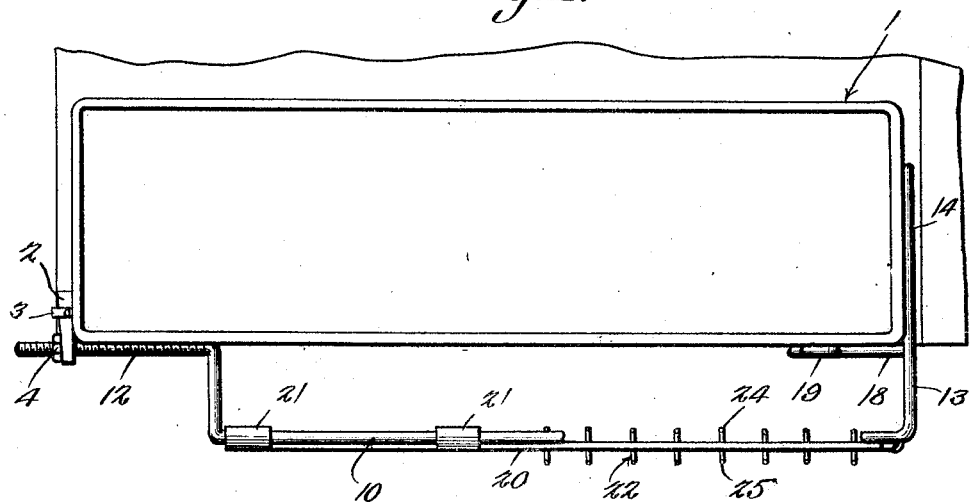
Fig. 1.
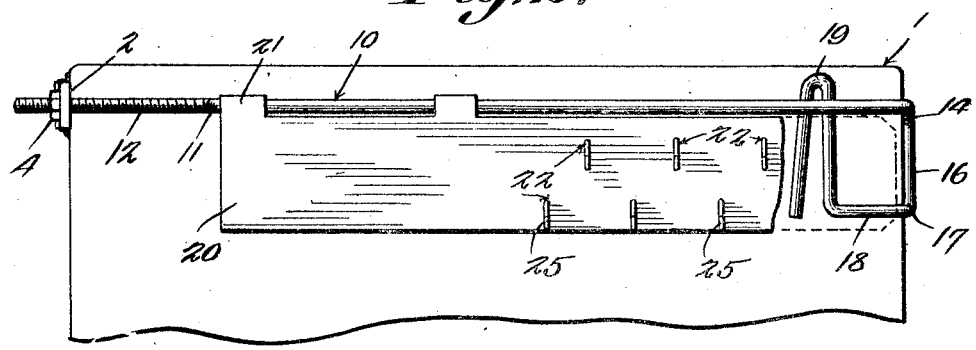
Fig. 2.
Fig. 3.
Fig. 4.
Inventor
C. M. Wolfe
By C. A. Snow & Co.
Attorneys Patented Oct. 26, 1926.

1,604,331

UNITED STATES PATENT OFFICE.

CLINTON M. WOLFE, OF COEBURN, VIRGINIA.

TOWEL OR UTENSIL RACK.

Application filed June 11, 1925. Serial No. 36,522.

This invention relates to towel or utensil racks primarily designed for use on the backs of warming ovens of ranges.

The object of the invention is to provide a rack of this character which may be extended to obtain access to the implements or articles hung thereon, and concealed when not in use.

Another object of the invention is to provide a rack of this character which may be readily clamped to the support in connection with which it is used without employing any screws, bolts or the like.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a plan view of this improved rack shown applied;

Figure 2 is a rear elevation thereof; and

Figure 3 is a detail perspective view of the rack detached.

Fig. 4 is a view of the display hook.

While the rack constituting this invention is primarily intended for use on the back of warming ovens and ranges obviously it may be used on any other supporting objects, such as the back of a safe or closet or kitchen cabinet or the like.

As shown a warming closet is illustrated on the back of which this improved rack is mounted, said rack being clamped to the ends of the closet, one end being secured by means of a wedge-like bracket 2 adjustably mounted in a keeper 3 carried by the end of the closet and through one end of which the rack extends and is equipped with a clamping nut 4.

The rack proper comprises a heavy wire or rod 10 having one end offset inwardly as shown at 11, said end 12 extending parallel with the body of the rod and threaded at its free end for the reception of nut 4. This offsetting of end 12 spaces the body portion of the rack a suitable distance from the support on which it is mounted to permit objects on said rack without contacting with the support.

The other end of the rod is bent laterally inward at right angles as shown at 13, said portion or arm 13 being bent at its outer end to form a loop 14 designed to lie flat against one end of the support 1. The lower member 15 of said loop is bent downwardly as shown at 16 and then forwardly as shown at 17 forming an L-shaped arm, the short arm 17 of which merges into a laterally extending rod 18 designed to lie parallel with the rear wall of the supporting member 1 and which merges into an upstanding inverted V-shaped loop 19 which is designed to bear against the rear face of the member 1 to assist in holding the rack against turning.

Mounted on the rod 10 is an article supporting plate 20 having bearings 21 at its upper end which are rotatably and slidably mounted on the rod 10 and are positioned respectively at one end and about midway the length of the plate. This arrangement of the bearings 21 provides for the plate 20 being moved longitudinally of the rod 10 toward the right to project the plate end beyond the end wall of the support 1 so as to expose the article supporting hooks 22 carried by the plate. These hooks 22 as shown are made W-shaped in form as shown in Fig. 4, the central loop 23 of which are mounted in apertures in the plate 20 with one hook portion 24 located on one face of the plate and the other 25 on the other face thereof. By this arrangement of hooks articles may be suspended from either side of the plate or from both sides on the same hook and thus economize in space.

In the use of this rack the parts being positioned as shown in Figures 1 and 2 the loop 14 lies flat against one edge of the oven or support 1 while the loop 19 lies against the rear face thereof. The threaded end 12 of the rod is then inserted through the wedge-shaped member 2 and by forcing said member 2 tightly into the keeper 3 the bracket is clamped on the support and tightening of the nut 4 operates to more tightly clamp it.

In the use of the rack the plate 20 may be slipped longitudinally toward the right when it is desired to obtain access to the hooks 22, for applying or removing an article.

When not in use the plate 20 may be slipped toward the left to the extreme limit thereof on rod 10 and when so positioned will be out of sight and yet readily accessible for use when wanted.

I claim:—

1. In a device of the class described, a rod including a body one end of the rod being inwardly offset and disposed approximately parallel to the body, the other end of the rod being fashioned into a loop disposed approximately at right angles to the first-specified end of the rod, clamping means on the first-specified end of the rod and cooperating with the loop to grip spaced portions of a support, one arm of the loop being extended downwardly, inwardly, and upwardly, to form portions located in a plane about parallel to the body and approximately at right angles to the loop, said portions being adapted to bear against the support thereby to prevent the rod from tilting upwardly and downwardly, and an article carrier adjustable along the body portion of the rod.

2. A rack of the class described comprising a metal rod having one end offset and threaded and the other end offset and provided with a support engaging loop which merges into an L-shaped arm having a lateral extension and an upstanding inverted V-shaped loop for clamping engagement with the back of the supporting object, and a plate having longitudinally spaced bearings near its inner end for slidable engagement with the body portion of the rod, said plate having its free end projectible beyond the bracket and provided with hooks for supporting articles to be suspended.

In testimony that I claim the foregoing as my own, I have hereto affixed my signature.

CLINTON M. WOLFE.